Figure 1:
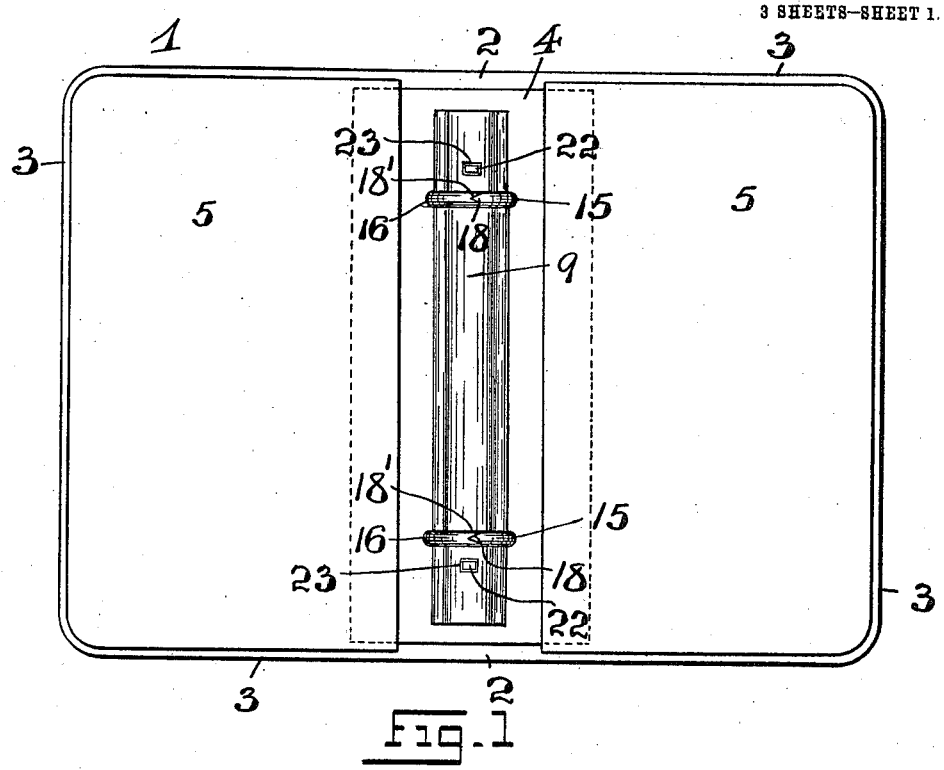

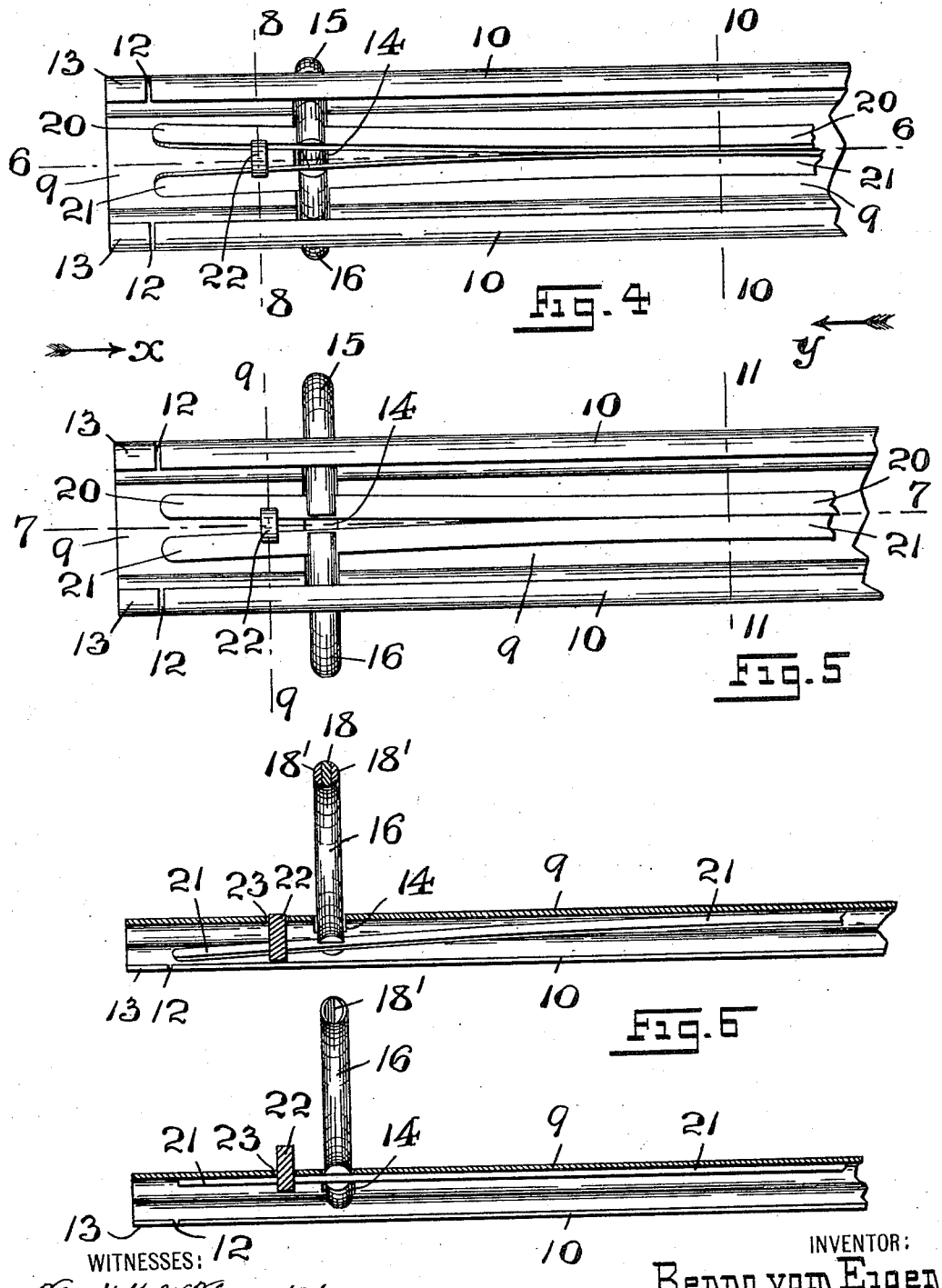

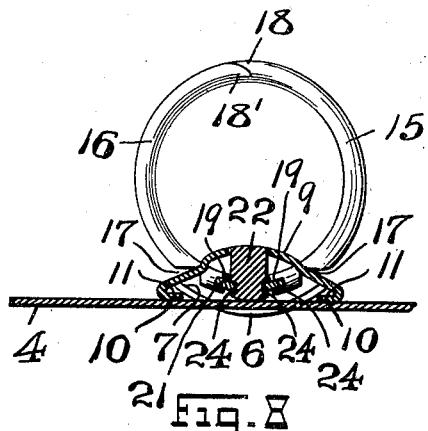
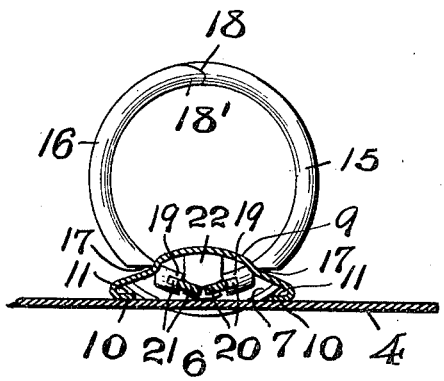
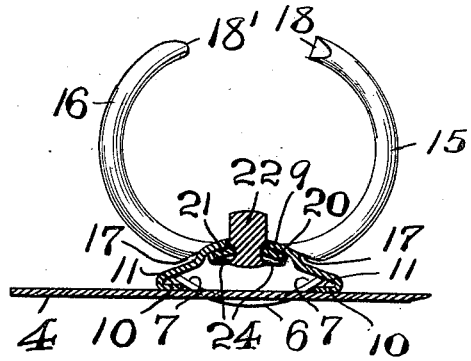
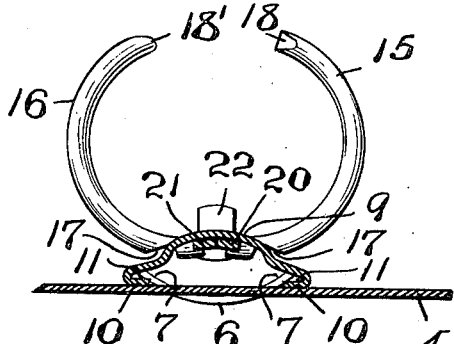
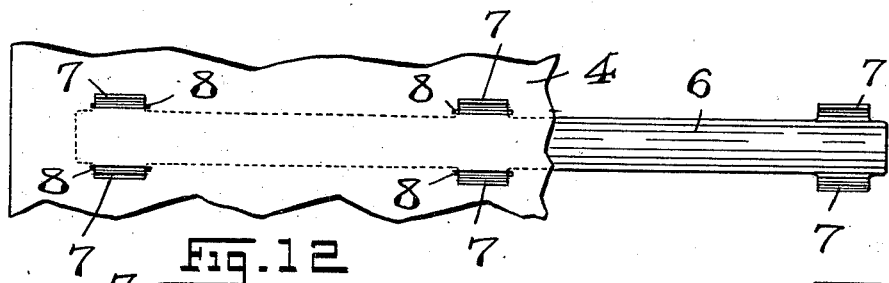
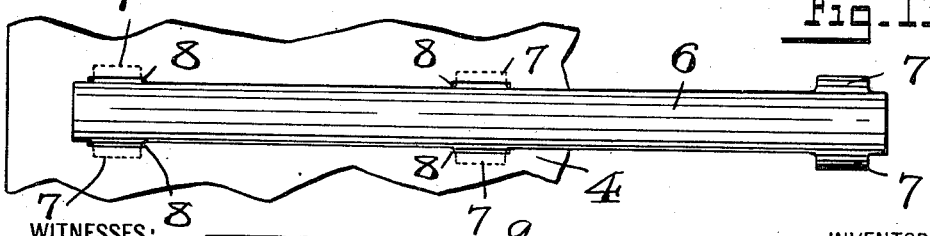

UNITED STATES PATENT OFFICE.

BENNO VOM EIGEN, OF NEWARK, NEW JERSEY, ASSIGNOR TO AUG. GOERTZ & CO., A CORPORATION OF NEW JERSEY.

LOOSE-LEAF BINDER.

997,608. Specification of Letters Patent. Patented July 11, 1911.

Application filed February 2, 1911. Serial No. 606,072.

*To all whom it may concern:*

Be it known that I, BENNO VOM EIGEN, a citizen of the United States, residing at Newark, in the county of Essex and State of New Jersey, have invented certain new and useful Improvements in Loose-Leaf Binders; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in loose leaf-binders; and, the invention has reference, more particularly, to a novel and simple construction of loose-leaf binder of the split or broken ring-type, the same comprising a novel and simple means for operatively mounting the binding rings in their operative relation with the binding or cover-portions of the binder, with a view to reducing to a minimum, in the number of parts and in the simplicity of their detail construction and arrangement, the said mounting means.

The invention has for its principal object to provide a loose-leaf binder of the split or broken ring type of great simplicity as to its various parts; and, furthermore, to provide a construction, the parts of which are arranged in a simple manner, and are provided with means for easily and securely retaining the same in connection with a binding or cover-portion so as to render the same exceedingly strong and durable.

A further object of this invention is to provide an arrangement of mounting means for supporting the binding rings, which not only present the latter conveniently for the reception of the loose leaves, but also protects the leaves connected with the binding rings from any contact with the working or actuating means whereby the binding rings are caused to perform their various functions.

A further object of the present invention is to provide an extremely simple means, both in construction and operation, for actuating said binding-rings.

Other objects of this invention not at this time more especially mentioned will be clearly understood from the following detailed description of the invention.

With the various objects of my invention in view, the said invention consists, primarily, in the loose-leaf binder hereinafter more fully set forth; and this invention consists, furthermore, in the novel arrangements and combinations of the devices and parts, as well as in the details of the construction of the same, all of which will be more fully described in the accompanying specification and then finally embodied in the clauses of the claims, which are appended to and which form an essential part of said specification.

The invention is clearly illustrated in the accompanying drawings, in which:—

Figure 2:
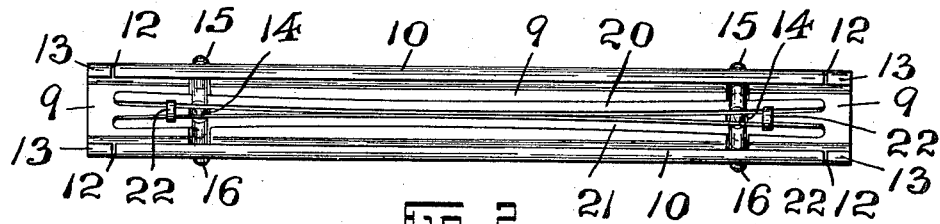
Figure 3:
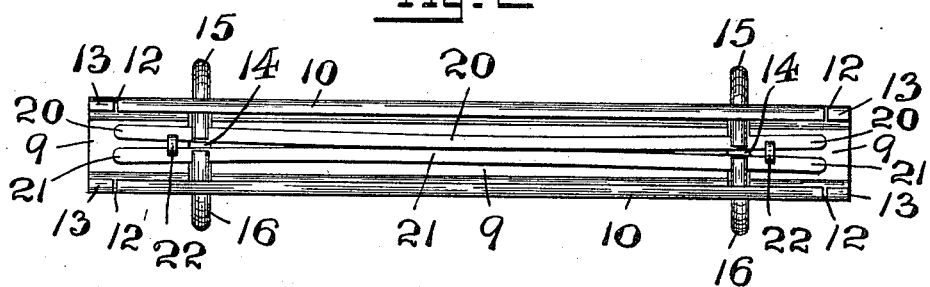

Figure 1 is a plan view of a loose-leaf binder with its cover-portions open, and the loose leaves removed therefrom, showing one embodiment of the principles of the present invention. Fig. 2 is a bottom view of a binding-ring actuating means and the ring-supporting means with which the same is connected, the binding rings being shown in their closed relation; and Fig. 3 is a similar view except that said binding rings are shown in their opened relation. Figs. 4 and 5 are large detail views similar, respectively, to Figs. 2 and 3, the same being drawn to more clearly show the actuating means and the operation of the same upon the binding rings. Fig. 6 is a large central longitudinal vertical section taken on line 6—6 in said Fig. 4; and, Fig. 7 is a similar section taken on line 7—7 in said Fig. 5. Fig. 8 is a large detail cross-section taken on line 8—8 in said Fig. 4, looking in the direction of the arrow $x$; and Fig. 9 is a large detail cross-section taken on line 9—9 in said Fig. 5, also looking in the direction of the said arrow $x$. Fig. 10 is a larger detail cross-section taken on line 10—10 in said Fig. 4, looking in the direction of the arrow $y$; and, Fig. 11 is a large detail cross-section taken on line 11—11 in said Fig. 5, looking in the same direction of the arrow $y$. Fig. 12 is a detail plan view of an anchor-plate and a portion of the binding to which it is secured, showing the relation of said anchor-plate to the said binding; and Fig. 13 is a rear view of the same. Fig. 14 is a large detail cross-section taken on an enlarged scale, said view illustrating one means for securing the ring-supporting means to said anchor-plate.

Similar characters of reference are employed in the above described views, to indicate corresponding parts.

Referring now to the several figures of the drawings, the reference-character 1 indicates the complete loose-leaf binder, the same comprising a binding back 2 from each side of which extend the cover-portions 3. Registering with the inner side of said binding back 2 is a binding back-lining 4. Each cover-portion 3 is also provided with a lining-member 5, one of the marginal edges of each member 5 overlapping a marginal edge of the said binding-back lining 4. The respective lining members 5 and said binding-back lining 4 are preferably glued in place, but the same may be otherwise secured in place, if desired.

Inserted between the said binding-back 2 and the said binding-back lining 4 is an anchor-plate 6 which is preferably of a concave formation throughout its length, so as to conform to the usual curve found in the backs of book-bindings. Suitably disposed along each longitudinal marginal edge of the said anchor-plate, and integrally connected therewith, are a suitable number of outwardly projecting tongues or lugs 7 which extend through suitably disposed slots or openings 8 with which said binding-back lining 4 is provided, so that the free ends of said tongues or lugs 7 are presented slightly above the inner side of said binding-back lining 4.

The reference-character 9 indicates a ring-carrying plate which is provided upon each longitudinally extending marginal edge with a turned-over portion 10, the same providing in connection with the main body of said ring-carrying plate 9, longitudinally extending receiving grooves 11 in which are respectively received the free ends of the said tongues or lugs 7 of the anchor-plate 6, whereby said ring-carrying plate is operatively supported upon and is connected with the binding-back 2 and its cover-portions 3. Those parts of the said turned-over portions 10 of the ring-carrying plate 9 located at or near the respective ends of the said turned-over portions 10 are provided with transverse cuts or slits 12 which separate the free-end-portions of said turned-portions 10 from the main bodies of the same, thereby providing suitable retaining-lugs 13, which may be crushed or flattened down as illustrated in Fig 14 of the drawings, so as to provide suitable stops which block or project into the lines of said receiving grooves 11, and thereby serve to prevent the said ring-carrying plate 9 from being withdrawn from its supported and secured connection with the tongues or lugs 7 of the anchor-plate 6. Said ring-carrying plate 9 is also provided in its main body-portion with a desired number of transversely extending elongated openings or slots 14 through each of which projects in an upward direction a split or broken ring-member. Each split or broken ring-member comprises a pair of ring-like sections 15 and 16, the respective ring-sections 15 and 16 being provided in their lower portions with suitable notches or bearing-portions 17 which embrace and engage with said ring-carrying plate 9 at the ends of said openings or slots 14, as fulcrums, so as to provide for the breaking or opening and closing movements of the said ring-sections. The upper ends of said ring-sections 15 and 16, respectively, are provided with a projection forming a male closing joint 18 and a groove forming a female closing joint 18', which are brought together in the manner of a dovetail, when said ring-sections 15 and 16 are in their normally closed relations, each to the other, to present an unbroken and smooth binding-ring member. The lower ends of said ring-sections 15 and 16 are each provided with grooved or cut-away portions 19 by means of which the said ring-sections 15 are adapted to operatively connect with and engage a longitudinally extending actuating spring 20, which extends from ring-section to ring-section, and lies along the under side of said ring-carrying plate 9. In a like manner, the grooves or cutaway portions 19 of the ring-sections 16 are adapted to operatively connect with and engage another longitudinally extending actuating spring 21, which also extends from ring-section to ring-section, and lies along the underside of said ring-carrying plate 9. Suitably arranged and disposed between the free end-portions of the said actuating springs 20 and 21, as they lie adjacent to each other, are spreader-posts 22 which extend upwardly from said ring-section into and through suitably disposed holes or openings 23, with which the body of the ring-carrying plate is provided and in which said spreader-posts ride in the course of their vertical movements. Said spreader posts are also formed in their vertical marginal edges with grooves 24 adapted to receive and retain in connected engagement with said spreader-posts the said springs 20 and 21. The function of said spreader-posts 22 is to produce a proper tension or spring-action in said springs 20 and 21, as they act upon said ring-sections 15 and 16. As shown in Figs. 6, 8 and 10 of the drawings, when said respective ring-sections 15 and 16 are swung together into their closed positions, the downward movement of their lower and inner ends presses the free ends of said springs 20 and 21 downwardly, this downward movement of said springs carrying with them, the said spreader-posts 22 which then serve to hold or retain the springs 20 and 21 in such positions with sufficient tension to retain the said ring-sections in their closed positions. When, however, the said ring-sections 15 and 16 are respectively caused to assume their opened positions, the said lower or inner ends move upwardly and carry therewith the said springs 20 and 21 and said spreader-posts 22, the parts assuming the positions illustrated in said Figs. 7, 9 and 11 of the drawings. The said spreader-posts 22 moving vertically and synchronously with the opening and closing movements of said ring-sections 15 and 16, tend to govern or control the actuating tension of the springs 20 and 21, so as to hold the ring-sections in either their closed positions, or in their open positions, whichever they may be manually caused to assume.

I am fully aware that changes may be made in the arrangement and combinations of the various devices and parts, as well as in the details of the construction of the same, without departing from the scope of my present invention, as set forth in the foregoing specification and as defined in the claims which are appended thereto. Hence, I do not limit my invention to the exact arrangements and combinations of the devices and parts as described in the said specification, nor do I confine myself to the exact details of the construction of the said parts as illustrated in the accompanying drawings.

I claim:

1. A loose-leaf binder comprising a ring-carrying plate, spring-controlled and pivotally mounted ring-sections connected with said plate, a turned-over portion at each longitudinal edge of said ring-carrying plate providing receiving-grooves, a binding, an anchor-plate embedded in said binding, outwardly projecting lugs connected with the longitudinal edges of said anchor-plate, the same being adapted to be received in said receiving grooves to engage and retain said ring-carrying plate, substantially as and for the purposes set forth.

2. A loose-leaf binder comprising a ring-carrying plate, spring-controlled and pivotally mounted ring-sections connected with said plate, a turned-over portion at each longitudinal edge of said ring-carrying plate providing receiving-grooves, a binding, an anchor-plate embedded in said binding, outwardly projecting lugs connected with the longitudinal edges of said anchor-plate, the same being adapted to be received in said receiving grooves to engage and retain said ring-carrying plate, and means for preventing longitudinal displacement of said ring-carrying plate from said lugs of said anchor-plate, substantially as and for the purposes set forth.

3. A loose-leaf binder comprising a ring-carrying plate, spring-controlled and pivotally mounted ring-sections connected with said plate, a turned-over portion at each longitudinal edge of said ring-carrying plate providing receiving-grooves, a binding, an anchor-plate embedded in said binding, outwardly projecting lugs connected with the longitudinal edges of said anchor-plate, the same being adapted to be received in said receiving grooves to engage and retain said ring-carrying plate, and means for preventing longitudinal displacement of said ring-carrying plate from said lugs of said anchor-plate, comprising retaining lugs formed at the ends of said ring-carrying plate and adapted to be squeezed into said receiving grooves to block the longitudinal movement of said lugs of said anchor-plate therethrough, substantially as and for the purposes set forth.

4. A loose-leaf binder comprising a ring-carrying plate, means for connecting the same in a binder, ring-sections fulcrumed with relation to said ring-carrying plate so as to provide split or broken ring-members projecting above the upper surface of said ring-carrying plate, elongated springs arranged upon the under side of said ring-carrying plate and in connection with the lower ends of said ring-sections, and means connected with said springs adapted to control the tension thereof as they act upon said ring-sections to maintain said ring-members formed by said ring-sections in either their open or closed positions, substantially as and for the purposes set forth.

5. A loose-leaf binder comprising a ring-carrying plate, means for connecting the same in a binder, ring-sections fulcrumed with relation to said ring-carrying plate so as to provide split or broken ring-members projecting above the upper surface of said ring-carrying plate, elongated springs arranged upon the under side of said ring-carrying plate and in connection with the lower ends of said ring-sections, and means connected with said springs adapted to control the tension thereof as they act upon said ring-sections to maintain said ring-members formed by said ring-sections in either their open or closed positions, said means comprising spreader-posts arranged between the free ends of said springs, said spreader-posts being capable of a vertical movement, substantially as and for the purposes set forth.

6. A loose-leaf binder comprising a ring-carrying plate, means for connecting the same in a binding, said ring-carrying plate being further provided with transverse openings in its body, ring-sections fulcrumed in said transverse openings so as to provide split or broken ring-members, each ring-section being provided with a lower end-portion extending beneath the body of said ring-carrying plate, a longitudinally extending spring connecting the lower ends of said ring-sections on one side of said ring-carrying plate, and another longitudinally extending spring connecting the lower ends of said ring-sections on the opposite side of said ring-carrying plate, and means coöperating with said springs to control the tension thereof as they act upon said ring-sections to maintain said ring-members formed by said ring-sections in either their open or closed position, substantially as and for the purposes set forth.

7. A loose-leaf binder comprising a ring-carrying plate, means for connecting the same in a binding, said ring-carrying plate being further provided with transverse openings in its body, ring-sections fulcrumed in said transverse openings so as to provide split or broken ring-members, each ring-section being provided with a lower end-portion extending beneath the body of said ring-carrying plate, a longitudinally extending spring connecting the lower ends of said ring-sections on one side of said ring carrying plate, and another longitudinally extending spring connecting the lower ends of said ring-sections on the opposite side of said ring-carrying plate, and means coöperating with said springs to control the tension thereof as they act upon said ring-sections to maintain said ring-members formed by said ring-sections in either their open or closed position, said means comprising spreader-posts arranged between the free ends of said springs, said spreader-posts being capable of a vertical movement, substantially as and for the purposes set forth.

8. A loose leaf-binder comprising a ring-carrying plate, means for connecting the same in a binding, said ring-carrying plate being further provided with transverse openings in its body, ring-sections fulcrumed in said transverse openings so as to provide split or broken ring-members, each ring-section being provided with a lower end-portion extending beneath the body of said ring-carrying plate, a longitudinally extending spring connecting the lower ends of said ring-sections on one side of said ring-carrying plate, and another longitudinally extending spring connecting the lower ends of said ring-sections on the opposite side of said ring-carrying plate, a spreader-post at each end of said ring-carrying plate engaging, respectively, the free ends of said springs, said spreader-post being capable of a vertical movement in slots or openings with which the body of said ring-carrying plate is provided, substantially as and for the purposes set forth.

9. A loose leaf binder comprising a ring-carrying plate, means for connecting the same in a binding, said ring-carrying plate being further provided with transverse openings in its body, ring-sections fulcrumed in said transverse openings so as to provide split or broken ring-members, each ring-section being provided with a lower end-portion extending beneath the body of said ring-carrying plate, a longitudinally extending spring connecting the lower ends of said ring-sections on one side of said ring-carrying plate, and another longitudinally extending spring connecting the lower ends of said ring-sections on the opposite side of said ring-carrying plate, a spreader post at each end of said ring-carrying plate, said posts being capable of vertical movements in slots or openings with which the body of said ring-carrying plate is provided, said spreader posts being further provided in their vertical marginal edges with grooves adapted to receive and retain the ends of said springs upon either side thereof, substantially as and for the purposes set forth.

In testimony, that I claim the invention set forth above I have hereunto set my hand this 30th day of January 1911.

BENNO VOM EIGEN.

Witnesses:
 FREDK. C. FRAENTZEL,
 FREDK. H. W. FRAENTZEL.

---

Copies of this patent may be obtained for five cents each, by addressing the "Commissioner of Patents, Washington, D. C."